US006995103B2

(12) United States Patent
Aghajanian (10) Patent No.: US 6,995,103 B2
(45) Date of Patent: Feb. 7, 2006

(54) TOUGHNESS ENHANCED SILICON-CONTAINING COMPOSITE BODIES, AND METHODS FOR MAKING SAME

(75) Inventor: Michael K. Aghajanian, Newark, DE (US)

(73) Assignee: M Cubed Technologies, Inc., Monroe, CT (US)

( * ) Notice: Subject to any disclaimer, the term of this patent is extended or adjusted under 35 U.S.C. 154(b) by 0 days.

(21) Appl. No.: 10/271,312

(22) Filed: Oct. 15, 2002

(65) Prior Publication Data

US 2003/0092558 A1    May 15, 2003

Related U.S. Application Data

(63) Continuation-in-part of application No. 09/990,175, filed on Nov. 20, 2001, now Pat. No. 6,862,970.

(60) Provisional application No. 60/329,358, filed on Oct. 15, 2001, provisional application No. 60/252,489, filed on Nov. 21, 2000.

(51) Int. Cl.
C04B 35/577    (2006.01)
C04B 35/573    (2006.01)
F41H 5/00      (2006.01)

(52) U.S. Cl. ............................ 501/88; 501/89; 501/91; 501/92; 89/36.02; 109/49.5

(58) Field of Classification Search .................. 501/92, 501/87, 91, 88, 89; 89/36.02; 109/49.5
See application file for complete search history.

(56) References Cited

U.S. PATENT DOCUMENTS 3,205,043 A    9/1965    Taylor (Continued)

FOREIGN PATENT DOCUMENTS

EP    0 798 281 A    10/1997

(Continued)

OTHER PUBLICATIONS

M.T. Lin and Marvin L. Cohen, "Microscopic Theory of the Phase Transformation and Lattice Dynamics of Si", *Phys. Rev. Letters*, (45) 12, Sep. 22, 1980, pp. 1004-1007.

(Continued)

*Primary Examiner*—Karl Group
(74) *Attorney, Agent, or Firm*—Jeffrey R. Ramberg (57) ABSTRACT

A silicon-containing composite body that would otherwise be brittle can be engineered to exhibit enhanced fracture toughness. Specifically, a silicon-ceramic composite body is produced, preferably by a reactive infiltration technique. The ceramic is selected such that it has a higher coefficient of thermal expansion (CTE) than does the silicon phase. At least at some point during processing, the silicon phase is at a temperature above its normal ductile/brittle transition temperature of about 500° C., and preferably above its melting point. The formed composite body containing the silicon phase is then cooled below its ductile/brittle transition. During cooling, the ceramic phase shrinks more than does the silicon phase, thereby placing the latter in a state of compressive stress. By the time the composite body has cooled to substantially ambient temperature, the induced compressive stress in the silicon phase is sufficient as to impart a measurable degree of semi-ductile character to the silicon phase. This pseudo-ductility manifests itself in the composite body as a significant increase in the fracture toughness of the body. For example, when the ceramic reinforcement was boron carbide particulate instead of silicon carbide (which has a CTE similar to that of silicon), fracture toughness increased by almost 30 percent.

17 Claims, 5 Drawing Sheets

U.S. PATENT DOCUMENTS

| | | | |
|---|---|---|---|
| 3,275,722 | A | 9/1966 | Popper |
| 3,495,939 | A | 2/1970 | Forrest |
| 3,725,015 | A | 4/1973 | Weaver |
| 3,796,564 | A | 3/1974 | Taylor et al. |
| 3,857,744 | A | 12/1974 | Moss |
| 3,859,399 | A | 1/1975 | Bailey et al. |
| 4,944,904 | A | 7/1990 | Singh et al. |
| 5,436,208 | A * | 7/1995 | Johnson ................. 501/88 |
| 5,840,221 | A | 11/1998 | Lau et al. |
| 5,962,103 | A | 10/1999 | Luthra et al. |
| 6,347,446 | B1 * | 2/2002 | Luthra et al. ............ 29/402.18 |
| 6,398,991 | B1 * | 6/2002 | Brazil et al. ............... 264/29.1 |
| 6,609,452 | B1 * | 8/2003 | McCormick et al. ...... 89/36.01 |
| 2004/0065868 | A1 * | 4/2004 | Aghajanian et al. ........ 252/500 |

FOREIGN PATENT DOCUMENTS

| | | |
|---|---|---|
| WO | WO 00 62007 A | 10/2000 |

OTHER PUBLICATIONS

T.K. Gupta and C.A. Andersson, "Transformation-Toughened Bulk Tetragonal Zirconia: I, Overview of Development and Properties", *Cer. Engr. & Sci. Proc.*, (7) 9-10, Sep.-Oct. 1986, pp. 1150-1157.

C.A. Andersson and T.K. Gupta, "Transformation-Toughened Bulk Tetragonal Zirconia: II, Mechanical Properties Dependence on Composition, Grain Size, and Temperature", *Cer. Engr. & Sci. Proc.*, (7) 9-10, Sep.-Oct. 1986, pp. 1158-1168.

J. Samuels, S.G. Roberts, and P.B. Hirsch, "The Brittle-to-Ductile Transition in Silicon," *Materials Science and Engineering*, A105/106 39-46 (1988).

P.D. Warren, "The Brittle-Ductile Transition in Silicon: The Influence of Pre-Existing Dislocation Arrangements," *Scripta Met.*, 23 637-42 (1989).

K. Sumino, "Dislocations and Mechanical Properties of Silicon," *Materials Science and Engineering*, B4 335-41 (1989).

"Reaction-Bonded Silicon Carbide", *Ceramics and Glasses Handbook*, American Society for Materials, p. 293, 1990.

P. Haasen, "Brittle-to-Ductile Transition in Silicon as a Model for Intermetallics", *Materials Science and Engineering*, A137 105-10 (1991).

Stewart J. Clark, "Pressure Effects in Semiconductors", (a portion of his thesis posted to the Internet at http://cmt.dur.ac.uk/sjc/thesis/thesis/node4.html on Oct. 31, 1996.).

"Crystal Lattice Structures: The Beta-Tin (A5) Structure", posted on the Internet at http://cst-www.nrl.navy.mil/lattice/struk/a5.html. Reference date: Jul. 1, 1997.

Murli H. Manghnani, Yuchang Wang, Fengying Li, Pavel Zinin and William Rafaniello, "Elastic and Vibrational Properties of $B_4C$ to 21 GPa," *Science and Technology of High Pressure, Proceedings of AIRAPT-17*, M.H. Manghnani, W.J. Nellis and M.F. Nicol, eds., Universities Press, Hyderabad, India, pp. 945-948 (2000).

Vladislav Domnich, Yury Gogotsi and Michael Trenary, "Identification of Pressure-Induced Phase Transformations Using Nanoindentation," *Mat. Res. Soc. Symp.* 649 Q8.9.1-Q8.9.6 (2001).

Vladislav Domnich, Yury Gogatsi, Michael Trenary and Takaho Tanaka, "Nanoindentation and Raman spectroscopy studies of boron carbide single crystals," *Appl. Phys. Letters*, 81 Nov. 11, 2002.

In Sub Han, Kee Sung Lee, Doo Won Seo, and Sang Kuk Woo, "Improvement of mechanical properties in RBSC by boron carbide addition", *J. Mat. Sci. Letters*, Chapman and Hall Ltd., London, GR, vol. 21, No. 9, May 1, 2002, pp. 703-706.

* cited by examiner

TOUGHNESS ENHANCED SILICON-CONTAINING COMPOSITE BODIES, AND METHODS FOR MAKING SAME

This patent document is a Continuation-in-Part of U.S. patent application Ser. No. 09/990,175, now U.S. Pat. No. 6,862,970 filed on Nov. 20, 2001, which application claims the benefit of U.S. provisional patent application Ser. Nos. 60/329,358, and 60/252,489, filed on Oct. 15, 2001, and Nov. 21, 2000, respectively.

BACKGROUND OF THE INVENTION

1. Field of the Invention

This invention relates to toughened silicon-ceramic composite bodies, especially those produced by a reactive infiltration process, e.g., reaction-bonded bodies. Reaction-bonded silicon carbide having a boron carbide filler or reinforcement particularly exemplifies the invention.

2. Discussion of Related Art

Reaction bonded silicon carbide (SiC) ceramics combine the advantageous properties of high performance traditional ceramics, with the cost effectiveness of net shape processing. These materials provide high surface hardness, very high specific stiffness, high thermal conductivity, and very low coefficient of thermal expansion (CTE). The processing consists of two steps. First, a carbon containing near net shape porous preform is fabricated; and second, the preform is reactively infiltrated with molten Si to form a primarily SiC body.

Reaction bonded silicon carbide ceramic offers extremely high levels of mechanical and thermal stability. It possesses low density (similar to Al alloys) and very high stiffness (~70% greater than steel). These properties lead to components that show little deflection under load, allow small distances to be precisely controlled with fast machine motion, and do not possess unwanted low frequency resonant vibrations. In addition, due to the high stiffness and hardness of the material, components can be ground and lapped to meet stringent flatness requirements. Moreover, as a result of very low coefficient of thermal expansion (CTE) and high thermal conductivity, reaction bonded SiC components show little motion with temperature changes, and are resistant to distortion if localized heating occurs. Also, due to an excellent CTE match with Si, reaction bonded SiC ceramics are well suited as substrates for Si handling operations. Furthermore, both Si and SiC possess refractory properties, which yields a composite with good performance in many high temperature and thermal shock applications. Finally, dense, high purity SiC coatings can be applied when extremely high purity and/or superior resistance to corrosion are required.

Reaction bonded SiC ceramics have many outstanding properties, including high specific stiffness, low coefficient of thermal expansion, and high thermal conductivity. However, they typically also exhibit low fracture toughness, and are therefore not suited for many applications where impact loading will occur.

Thus, materials investigators have experimented with various techniques for enhancing the toughness or impact resistance of such inherently brittle ceramic-rich materials. Perhaps the most popular approach has been to incorporate fibrous reinforcements and attempt to achieve crack deflection or fiber debonding and pull-out mechanisms during the crack propagation process.

More recently, some have alloyed the brittle silicon phase with different metals such as aluminum, to enhance toughness. For example, the assignee's aluminum-toughened SiC provides a nominally 75% increase in fracture toughness relative to its standard reaction bonded SiC. This toughness allows the composite to be used in applications where some impact will occur. In addition, the composite can be used in thin walled component designs that would be difficult to produce with a low toughness ceramic.

The presence of the aluminum results in an increase in thermal conductivity relative to the standard SiC product, which is valuable in heat sink applications or in components where localized heating can occur. In addition, the thermal conductivity is in excess of that of most metal matrix composites because no additional metallic alloying elements are used, e.g., magnesium.

Silicon is usually thought of as being a brittle material, but this statement pertains to its ambient temperature characteristics. A review of the literature finds that Si undergoes a brittle to ductile transition in the 500° C. temperature range. (J. Samueles, S. G. Roberts, and P. B. Hirsch, "*The Brittle-to-Ductile Transition in Silicon,*" Materials Science and Engineering, A105/106 (1988), pp. 39–36.) Warren observed that this temperature can be influenced according to the density of dislocations in the silicon. Specifically, he observed that the transition temperature decreased when dislocations were introduced to a silicon surface by a grinding operation. (P. D. Warren, "*The Brittle-Ductile Transition in Silicon: The Influence of Pre-Existing Dislocation Arrangements,*" Scripta Met., 23 (1989), pp. 637–42.)

Moreover, Gogotsi et al. of Drexel have achieved metal-like ductile machining of silicon at room temperature by controlling the stress state at the cutting tool-to-workpiece interface. (Y. Gogotsi, C. Baek, and F. Kirscht, "*Raman microspectroscopy study of processing-induced phase transformations and residual stress state in silicon*", Semicond. Sci. Tech. 14, (1999), pp. 936–44). Analysis of the Silicon crystal structure directly under the cutting tool by Raman microspectroscopy shows that the room-temperature ductile machining is obtained through a pressure-induced transformation of Silicon from the cubic diamond phase into a metallic beta-tin structure. This latter phase has mechanical properties of a typical metal and deforms plastically under the tool. Thus, under the correct loading conditions, ductile behavior of Silicon at room temperature can be obtained. Phase transformations in Silicon, as well as in boron carbide, can lead to additional energy dissipation, which is important in many applications, possibly including armor applications.

U.S. Pat. No. 3,857,744 to Moss discloses a method for manufacturing composite articles comprising boron carbide. Specifically, a compact comprising a uniform mixture of boron carbide particulate and a temporary binder is cold pressed. Moss states that the size of the boron carbide particulate is not critical; that any size ranging from 600 grit to 120 grit may be used. The compact is heated to a temperature in the range of about 1450° C. to about 1550° C., where it is infiltrated by molten silicon. The binder is removed in the early stages of the heating operation. The silicon impregnated boron carbide body may then be bonded to an organic resin backing material to produce an armor plate.

U.S. Pat. No. 3,859,399 to Bailey discloses infiltrating a compact comprising titanium diboride and boron carbide with molten silicon at a temperature of about 1475° C. The compact further comprises a temporary binder that, optionally, is carbonizable. Although the titanium diboride remains substantially unaffected, the molten silicon reacts with at least some of the boron carbide to produce some silicon carbide in situ. The flexural strength of the resulting composite body was relatively modest at about 140 MPa. A variety of applications is disclosed, including personnel, vehicular and aircraft armor.

U.S. Pat. No. 3,796,564 to Taylor et al., filed in 1967, discloses a hard, dense carbide composite ceramic material particularly intended as ceramic armor. Granular boron carbide is mixed with a binder, shaped as a preform, and rigidized. Then the preform is thermally processed in an inert atmosphere with a controlled amount of molten silicon in a temperature range of about 1500° C. to about 2200° C., whereupon the molten silicon infiltrates the preform and reacts with some of the boron carbide. The formed body comprises boron carbide, silicon carbide and silicon. Taylor et al. state that such composite bodies may be quite suitable as armor for protection against low caliber, low velocity projectiles, even if they lack the optimum properties required for protection against high caliber, high velocity projectiles. Although they desire a certain amount of reaction of the boron carbide phase, they also recognize that excessive reaction often causes cracking of the body, and they accordingly recognize that excessive processing temperatures and excessively fine-grained boron carbide is harmful in this regard. At the same time, they also realize that excessively large-sized grains reduce strength and degrade ballistic performance.

More recently, the assignee has likewise developed a reaction bonded boron carbide composite material because this system was thought to show potential as a candidate armor material, even if previous efforts suffered from various shortcomings. As examples of this "potential", hardness is believed to be important in making an armor material having high mass efficiency. Moreover, many armor applications such as aircraft and body armor, require low mass. Boron carbide possesses both of these characteristics. None of the individual components of this reaction bonded boron carbide system possesses inherent toughness.

U.S. Pat. No. 3,725,015 to Weaver discloses a process for making low porosity, essentially defect free, composite refractory shapes via a reactive infiltration process. A carbon-containing preform is infiltrated with a molten metal containing at least two constituents. One of the constituents is capable of reacting with the carbon to form a metal carbide in situ in the preform. The other constituent is added such that the infiltrant alloy has a thermal expansion close to that of the refractory material making up the matrix of the preformed shape, thereby regulating, and preferably eliminating residual stress and microcracking upon cooling to ambient temperature form the processing temperatures. Weaver furthermore discloses providing to the infiltrant alloy a metal corresponding to the metal of the refractory material for the purpose of preventing the infiltrant from leaching out of the metal constituent of the refractory material. For example, the incorporation of about 6 percent by volume of boron in silicon saturates the alloy sufficiently to prevent its dissolving boron out of a boron carbide refractory material matrix.

3. Discussion of Commonly Owned Patent Applications

International Patent Application No. PCT/US99/16449, filed on Jul. 23, 1999, and which published as Publication No. WO 01/07377 on Feb. 1, 2001, teaches that reaction-bonded or reaction-formed silicon carbide bodies may be formed using an infiltrant comprising silicon plus at least one metal, e.g., aluminum. Modifying the silicon phase in this way permits tailoring of the physical properties of the resulting composite, and other important processing phenomena result: Such silicon carbide composite materials are of interest in the precision equipment, robotics, tooling, armor, electronic packaging and thermal management, and semiconductor fabrication industries, among others. Specific articles of manufacture contemplated include semiconductor wafer handling devices, vacuum chucks, electrostatic chucks, air bearing housings or support frames, electronic packages and substrates, machine tool bridges and bases, mirror substrates, mirror stages and flat panel display setters. The contents of this commonly owned patent application are expressly incorporated herein in their entirety by reference.

SUMMARY OF THE INVENTION

It is an object of the instant invention to produce a composite material that is lightweight, stiff, strong and substantially pore-free.

It is an object of the instant invention to produce a composite material that has utility in precision equipment applications requiring a degree of impact resistance.

It is an object of the instant invention to produce a silicon-containing composite material of enhanced toughness.

It is an object of the instant invention to produce a toughened silicon-containing composite material without requiring complex reinforcement debonding/pull-out mechanisms.

It is an object of the instant invention to produce a toughened silicon-containing composite material without resort to adding significant amounts of tough metals.

These objects and other desirable attributes can be achieved through the engineering of silicon-containing composite bodies. According to the instant invention, a silicon-ceramic composite body is produced, preferably by a reactive infiltration technique. The ceramic component, such as a reinforcement or filler, is selected such that it has a higher coefficient of thermal expansion (CTE) than does the silicon phase. At least at some point during processing, the silicon phase is at a temperature above its normal ductile/brittle transition temperature of about 500° C., and preferably above its melting point. The formed composite body containing the silicon phase is then cooled below its ductile/brittle transition. During cooling, the ceramic phase shrinks more than does the silicon phase, thereby placing the latter in a state of compressive stress. By the time the composite body has cooled to substantially ambient temperature, i.e., about 20° C., the induced compressive stress in the silicon phase is sufficient as to impart a measurable degree of semi-ductile character to the silicon phase, even at ambient temperature.

This toughening effect has been observed in certain reaction-bonded boron carbide composites (RBBC). In this system, a molten infiltrant containing silicon and one or more sources of boron is contacted to a porous mass that contains at least some boron carbide, and also containing at least some free carbon. The molten infiltrant infiltrates the porous mass without a pressure or vacuum assist to form a composite body of near theoretical density. The silicon component of the infiltrant reacts with the free carbon in the porous mass to form in-situ silicon carbide as a matrix phase. Further, the tendency of the molten silicon to react with the boron carbide component can be suppressed or at least greatly attenuated by the alloying or doping of the silicon with the boron source. The resulting composite body thus comprises boron carbide dispersed or distributed throughout the silicon carbide matrix. Typically, some residual, unreacted infiltrant phase containing silicon and boron is also present and similarly distributed or interspersed throughout the matrix.

Regardless of the exact mechanism which is responsible for the observed result, the display of pseudo-ductility in silicon-containing composites such as RBBC is a surprising result; namely, because none of the constituents of this composite system taken by themselves exhibit toughness or ductility under ambient conditions, e.g., standard temperature and pressure. Such composites showing enhanced toughness should find numerous commercial applications because ceramic engineers are often concerned about the prospect of brittle failure, and are frequently engaged in searching for ways to increase toughness or impact resistance of ceramic-rich materials.

DEFINITIONS

"Areal Density", as used herein, means the mass of an armor system per unit area.

"CTE", as used herein, means Coefficient of Thermal Expansion, and unless otherwise noted, refers to the linear (not volumetric) CTE.

"Fine-grained", as used herein, means that the morphological features making up the microstructure of the reaction-bonded silicon carbide bodies of the instant invention are smaller than the microstructural features of most of the prior, commercially available reaction-bonded silicon carbide. Preferably, the microstructure of the instant reaction-bonded silicon carbide bodies is engineered such that the vast majority of morphological features do not exceed about 100 microns in size.

"Free Carbon", as used herein, means carbon that is intended to react with molten silicon to form silicon carbide. This term usually refers to carbon in elemental form, but is not necessarily limited thereto.

"Inert Atmosphere", as used herein, means an atmosphere that is substantially non-reactive with the infiltrant or the porous mass or preform to be infiltrated. Accordingly, this definition includes gaseous constituents that might otherwise be thought of as mildly reducing or mildly oxidizing. For example, forming gas, comprising about 4 percent hydrogen, balance nitrogen, might be considered to be an inert atmosphere for purposes of the present disclosure, as long as the hydrogen does not reduce the filler material and as long as the nitrogen does not appreciably oxidize the infiltrant or filler material.

"Mass Efficiency", as used herein, means the areal density of rolled homogeneous steel armor required to give the same ballistic performance as that of the targets being tested, expressed as a ratio.

"Reaction Bonded Silicon Carbide", or "RBSC", refers to a ceramic composite body produced by reaction-bonding, reaction-forming, reactive infiltration, or self-bonding.

"Reaction-Bonded Boron Carbide", or "RBBC", as used herein, means a class or subset of reaction-bonded silicon carbide composites in which the filler or reinforcement of the composite, i.e., the phase being bonded, includes boron carbide.

"Reaction-Bonding", "Reaction-Forming", "Reactive Infiltration" or "Self-Bonding", as used herein, means the infiltration of a porous mass comprising carbon in a form that is available to react with an infiltrant comprising silicon to produce a ceramic composite body comprising at least some silicon carbide produced in-situ.

"Substantially inert filler material", as used herein, means a filler material that is substantially non-reactive chemically with the molten infiltrant material under the specific processing conditions.

"Total areal density", as used herein, means the areal density of ceramic armor material plus the areal density of any other material that should properly be considered a part of the assembly of components making up an armor system. Examples of other materials would be fiber reinforced polymeric materials frequently used to back up or encase a ceramic armor plate.

DETAILED DESCRIPTION OF THE INVENTION AND PREFERRED EMBODIMENTS

Toughness enhancement and other desirable attributes can be achieved in otherwise brittle materials through the application and engineering of silicon-containing composite bodies. The toughening phenomenon was first observed in a reaction-bonded boron carbide composite, in which a porous mass of boron carbide particulate plus some free carbon in the form of a carbonaceous resin was infiltrated with a mass of molten silicon containing some alloyed boron. The boron addition to the silicon infiltrant, however, does not appear to contribute to the semi-ductile behavior that was seen in the silicon phase of a fractured sample of the formed RBBC composite. Without wishing to be bound to any particular theory or explanation, it appears that the toughening effect results from constraining of the residual silicon phase in the composite body by the higher CTE boron carbide particles during cooling. Specifically, the boron carbide phase places the silicon phase in a state of compression during cooling of the composite to ambient temperature following thermal processing above the melting point of the silicon infiltrant. Thus, the silicon-toughening phenomenon should be generic to composite systems in which another component within the composite material places the silicon component in a state of compressive stress during or following thermal processing.

A convenient way to accomplish this toughening of silicon is to incorporate the silicon as a component of a composite material in which another component of the composite has a larger CTE than does the silicon. Particularly preferred is a reactive infiltration approach, such as that used to make reaction-bonded silicon carbide composites. There, molten silicon metal in bulk form is contacted to a porous mass containing substantially inert ceramic material such as silicon carbide particulate, plus some free carbon. The molten silicon wets the porous mass, and wicks into it. Some of the molten silicon chemically reacts with the free carbon to produce additional silicon carbide (in-situ). When the entire mass has been infiltrated by molten silicon, the infiltrated mass is solidified to yield a substantially pore-free composite body featuring silicon carbide, plus any other inert ceramic that was originally provided, plus some residual silicon metal distributed throughout the composite body. However, the toughening effect has not been observed in these composite bodies that contain substantially only SiC and Si, perhaps because there is insufficient difference in CTE between SiC and Si to create a sufficiently large compressive stress state in the Si upon cooling to ambient temperature. By way of review, $B_4C$ has a CTE of about 5.4 ppm/K, whereas the CTE of Si and SiC is each nominally about 4 ppm/K.

The fact that some of the silicon infiltrant reacts as it infiltrates the porous mass in a reaction-bonded composite system should not make a large difference on the toughening of the residual silicon phase. Accordingly, the effect should also be present in those silicon infiltration composite systems that do not involve reaction of the silicon infiltrant, which are sometimes referred to as "siliconization." U.S. Pat. No. 3,951,587 to Alliegro et al. is an example of siliconization. Moreover, it may be possible that other, non-infiltration-based techniques may also exhibit the effect, such as powder metallurgical techniques, whereby the silicon component of the composite may be admixed in powder form with the inert ceramic filler, consolidated to a preform such as by dry pressing, then sintered. Still further, it may be possible, through utilization of presses such as hot presses or hot isostatic presses, to produce bulk silicon featuring this semi-ductile behavior. Specifically, bulk silicon in a molten condition, or at least above its ductile-brittle transition temperature, is cooled under externally applied bulk pressure. As mentioned earlier, Gogotsi et al. have observed metal-like ductility of bulk silicon, specifically, from the localized pressure of a cutting tool tip during a machining operation. Ibid.

As long as the volumetric loading of the higher CTE component is sufficient, the silicon component should be in a compressive stress state, regardless of whether the silicon is interconnected or isolated. As the volumetric loading of the higher CTE phase is reduced, however, at some point, the higher CTE phase may become isolated instead of being the matrix, or part of the matrix. Then, the stress state on the silicon phase becomes more complex, and it is unclear whether the toughening phenomenon can be maintained at such reduced loadings. For example, where the silicon phase makes up the matrix and the higher CTE material is dispersed as a noncontiguous phase within this matrix, upon cooling, both components would be expected to be in a tensile stress state in radial directions.

In any event, the phenomenon is definitely observed in reaction-bonded boron carbide composites that are highly loaded in boron carbide, e.g., about 75 volume percent, even though the silicon is interconnected, and thus could be thought of as forming a co-matrix. Strictly speaking, the matrix here consists of the in-situ silicon carbide phase, and the boron carbide forms the reinforcement phase. The boron carbide, however, being present in substantially greater amount than the silicon carbide, strongly influences the CTE of the matrix, i.e., increases it. In this sense, then, the boron carbide is sometimes thought of as being part of the matrix.

In the RBBC system, calculation has shown that the compressive stresses induced in the silicon phase are extremely large. Here, the constraining particles, namely the boron carbide phase, also possesses a large stiffness (elastic modulus). If it is necessary to apply very large compressive stress to the silicon to cause it to behave in a pseudoductile fashion, then it may be necessary for the constraining phase to also possess a high elastic modulus. Otherwise, the applied stress simply can be accommodated by straining the constraining phase. In other words, if large compressive stresses are required, then aluminum probably could not be the constraining phase. Most of the candidate constraining phases are expected to be ceramic-based, but certain high modulus metals such as tungsten might qualify.

Without wishing to be bound to any particular theory or explanation, it may be that by solidifying the silicon component of a composite material under conditions whereby the silicon is placed into a state of compressive stress, the population of atomic scale defects such as dislocations is increased. As mentioned earlier, there is some experimental evidence in the prior art that introducing surface dislocations in silicon by a grinding process decreased the ductile-brittle transition temperature. Another possibility is that solidifying in the compressive state permits the appearance of one or more high pressure phases of silicon, such phase(s) exhibiting the semi-ductile character, and which phase(s) would not be favored thermodynamically under normal, ambient pressure conditions. Such a high pressure phase may itself exhibit the observed semi-ductile behavior, or perhaps may function in a way similar to a transformation-toughening mechanism. There, the high pressure form may be denser than the ambient pressure crystallographic form, and when the compressive stress state is diminished or removed, for example, when a tensile crack moves into close proximity, the high pressure phase transforms to the ambient pressure phase, with a concurrent volume increase associated with this transformation. The volume increase tends to dissipate at least some of the tensile stress on the neighboring material, thereby inhibiting further crack growth by requiring the application of additional strain energy to the material to raise the tensile stress and start the crack propagating again. Still another possibility is that the compressive state of the silicon "locks in" the high temperature crystallographic form at ambient temperature. This high temperature form of silicon has the "beta tin" crystal structure, and is ductile. Thus, this isomorph is sometimes referred to as "metallic silicon." In contrast, the diamond form of silicon is sometimes referred to as a "metalloid" or a "semi-metal".

Yin et al. state that their calculations show that silicon will transform at ambient temperature from it usual diamond crystalline form to the beta-tin form under high hydrostatic pressure. (M. T. Yin and Marvin L. Cohen, "*Microscopic Theory of the Phase Transformation and Lattice Dynamics of Si*", *Phys. Rev. Letters,* 45, 12, (1980), pp.1004–7.) Thus, this high pressure phase is the beta-tin phase, according to these authors.

Whatever the operative mechanism, a fracture toughening phenomenon has now been observed in boron carbide-containing composite materials made by a silicon infiltration technique. This result was quite unexpected because none of the starting materials is particularly tough, and none of the components of the formed composite body was expected to be tough, or to display any degree of ductility during fracture.

In accordance with a preferred embodiment of the present invention, a substantially pore-free, mechanically strong composite material of increased fracture toughness is produced that includes at least some boron carbide, preferably in a large volume fraction or combined with one or more exceptionally hard, stiff materials such as silicon carbide to yield a large fraction of very hard, very stiff phase. Furthermore, through careful control of the processing conditions, e.g., to suppress reaction of the boron carbide phase, a superior material can be produced that exhibits exceptional specific stiffness and resistance to impact from ballistic projectiles, particularly small arms fire. In addition, the composite bodies produced according to the present invention maintain dimensional tolerances upon thermal processing better than do hot pressed and sintered bodies.

Thus, for economy and manufacturing flexibility, among other reasons, the preferred embodiment boron carbide-based composite bodies of the instant invention are produced by a reactive infiltration technique, usually termed "reaction forming" or "reaction bonding", whereby a molten infiltrant comprising silicon is contacted to a porous mass comprising carbon and at least one hard ceramic filler material that includes boron carbide. The molten silicon-based material infiltrates the interconnected porosity in the porous mass or preform. The molten silicon contains one or more sources of boron in a quantity sufficient to attenuate the tendency of the boron carbide component to chemically react with the molten silicon. Concurrent with the infiltration, the silicon reacts with at least some of the carbon in the porous mass or preform to form silicon carbide. The amount of infiltrant is generally provided in such a quantity that the carbon in the porous mass or preform is completely reacted to silicon carbide, with sufficient additional infiltrant supplied to fill any remaining void space between the filler material and the in-situ silicon carbide. The resulting composite materials feature a matrix of the in-situ silicon carbide. Dispersed throughout the matrix is the filler and residual, unreacted infiltrant material. As the residual infiltrant is often interconnected, it is sometimes considered as part of the matrix of the composite.

In terms of the preferred processing conditions, atmospheres that are compatible with this type of infiltration include vacuum or inert atmospheres such as argon, although vacuum is preferred. The vacuum does not have to be "hard" or high vacuum; that provided by a mechanical "roughing" pump is entirely adequate. Although the infiltration tends to be more robust at the higher temperatures, it is also more aggressive, which could give rise to unwanted side reactions, particularly of the boron carbide component. Further, it is more difficult to confine the infiltrant spatially at higher temperatures. Moreover, higher processing temperatures are more likely to give rise to exaggerated grain growth. For all of these reasons, the preferred processing temperatures are those that are generally low yet consistent with reliable infiltration. For infiltrating silicon-based metals into a boron carbide-containing particulate mass in a rough vacuum environment, temperatures in the range of about 1450° C. to 1600° C. should be satisfactory.

Boron carbide is an especially attractive filler material candidate where the mass of the formed composite article is of concern because of its low theoretical density of about 2.45 to 2.55 grams per cubic centimeter. (The range in reported theoretical density may be because boron carbide is not a line compound per se, but instead can exhibit a limited range of stoichiometry.) Because the Young's Modulus of boron carbide is comparable to that of silicon carbide (about 450 GPa), boron carbide has a higher specific stiffness than does silicon carbide. High specific stiffness is a valuable property in applications such as those requiring precise motion and control of motion, especially where large loads or high accelerations are involved. Moreover, boron carbide is even harder than silicon carbide. Thus, a RBSC composite body featuring boron carbide as a reinforcement or filler material (i.e., "RBBC") may offer higher hardness yet lower specific gravity as compared to a RBSC composite having silicon carbide as the filler material.

Under most of the prior silicon infiltration conditions, however, boron carbide is at least somewhat reactive with the molten silicon. Although one reaction product of such reaction is more in situ silicon carbide, where one is attempting to maximize the boron carbide loading, it would be desirable if the boron carbide could remain substantially unaffected by the infiltrant, e.g., if the silicon did not react with the boron carbide. This problem is solved by dissolving some boron into the molten silicon, thereby reducing the activity of the silicon for reaction with boron carbide. Although pure silicon will eventually become saturated in boron and carbon as it reacts with the boron carbide phase in the porous mass or preform, this approach is not preferred, unless this porous mass or preform is "sacrificial", and not the ultimate article of commerce being produced. In many instances, reaction of the boron carbide reinforcement with the silicon infiltrant has led to cracking of the resulting silicon carbide composite body. Instead, what is preferred is to provide a source of boron to the silicon-based infiltrant prior to the infiltrant making contact with the boron carbide in the porous mass or preform. Any boron-containing substance that can be dissolved in silicon may be useful in the context of the instant invention; however, elemental boron or boron carbide are particularly preferred.

One can envision any number of techniques for adding a boron source material to the silicon infiltrant. The approach preferred according to the instant invention is to support the preform to be infiltrated on, and to feed the infiltrant into the preform by way of, kiln furniture consisting of a porous preform comprising boron carbide. Specifically, a silicon-containing infiltrant can infiltrate kiln furniture (later referred to as a "feeder rail" or "beam") containing at least some boron carbide. The kiln furniture may be provided in either the porous condition, e.g., as a preform; or in the "already infiltrated" condition, e.g., as a composite body. The preform that ultimately is intended to become an article of commerce upon infiltration, sometime referred to as the "object" preform, is supported on the kiln furniture. The silicon-containing infiltrant dissolves at least some of the boron carbide of the kiln furniture, and may even become saturated with carbon and/or boron. When this molten silicon then continues to infiltrate into the object preform that is in contact with the kiln furniture, the infiltrating silicon will react very little if at all with the boron carbide in the object preform. Any cracking of the kiln furniture as a consequence of silicon reacting with the boron carbide in the kiln furniture should not unduly affect the continued infiltration of the silicon into the object preform. Of course, the supporting kiln furniture is not required to contain boron carbide per se. Many boron-containing substances in which the boron is able to dissolve in the silicon component of the infiltrant should be satisfactory; however, substances such as boron oxide may not be sufficiently refractory under the thermal processing conditions. Further, the boron source is not required to be located in the kiln furniture; it may be alloyed or otherwise introduced into the silicon component of the infiltrant at most any point prior to the silicon making contact with the boron carbide of the object preform. For example, it is useful when building the "lay-up" for infiltration to supply boron carbide particulate to the bottom of the vessel housing the molten silicon infiltrant, dispersed, for example, as loose powder between the feeder rails. Moreover, the presence of a boron nitride coating on the porous mass or preform to be infiltrated also helps to suppress the boron carbide reaction.

The hardness of the composite is proportional to the volume fraction of hard phases such as silicon carbide or boron carbide making up the composite material. One technique for maximizing the amount of hard phase in the composite body is to produce a preform that is highly loaded volumetrically in the hard phases. Highly loaded preforms can be produced by utilizing a distribution of filler material particle sizes sufficiently wide so that small particles can nest or fit within the interstices of larger particles. Because these two parameters of maximizing the loading of hard fillers in the preform while capping or limiting the size of the largest particles inherently are at odds with one another, careful attention to processing parameters is required to achieve both in the same material. Fortunately, one can still produce a preform that is relatively highly loaded in hard filler while limiting the size of the filler bodies in such a way that, for example, at least 90 percent by volume are smaller than about 100 microns in diameter. Even with this upper limit on the size of the largest particles, it is still possible, for instance, to produce preforms that are 65 volume percent or more loaded in hard ceramic phases such as boron carbide.

An important, but by no means the only important embodiment or application of these boron carbide containing composites is that of armor for defeating ballistic projectiles. A particularly high-performing armor material can be realized when the composite system is designed such that it features a sufficiently high volumetric loading of the hard ceramic phases, particularly the boron carbide phase, as to meet overall hardness levels believed to be important, and then also so designed as to limit the size of the largest grains or crystals making up the composite body. The alloying of the silicon infiltrant with a boron source material facilitates the preservation of boron carbide, particularly of the finer grains of boron carbide, in the final composite structure, by suppressing the chemical reaction of boron carbide with silicon.

Although most any of the known techniques may be employed to produce a porous preform that can be infiltrated by a molten infiltrant comprising silicon, the techniques that seem to be better able at producing preforms that are highly loaded with one or more fillers are those that utilize a liquid phase, for example, sediment casting, slip casting or thixotropic casting.

Again, it is thought that the toughening phenomenon of the instant invention is not limited to reaction-bonded composite systems containing boron carbide, but can be generalized to composite systems having one or more components whose CTE is greater than that of silicon. In this regard, other substantially inert filler materials might include titanium diboride or aluminum nitride. Here, the thermal expansion coefficients are about 8.1 and 4.5 ppm/K, respectively.

The filler material making up the porous mass to be infiltrated may be provided in a number of different morphologies, including particulates, platelets, flakes, whiskers, continuous fibers, microspheres, aggregate, etc. Particulates are often preferred for reasons of economy and availability.

While not possible through visual inspection, it is possible using diffraction techniques to distinguish the silicon carbide matrix that is reaction-formed from any silicon carbide that may be present as a reinforcement or filler material. Specifically, the reaction-formed silicon carbide typically is of the beta polymorph, at least under the instant processing conditions. In contrast, most commercially available silicon carbide, particularly the commodity grades, is the alpha form that is so commonly used as a filler material. Accordingly, one can provide at least approximate quantitative data as to the relative amounts of each that are present in the composite body.

A wide range of sizes of filler material bodies can be successfully infiltrated using the reaction-forming process, e.g., bodies ranging from several millimeters in size down to bodies on the order of a micron in size. Again, when the goal is to produce structures that possess high strength, high ballistic resistance and/or low surface roughness, the filler bodies should not be permitted to get much larger than about 100 microns in size.

In addition to keeping the starting size of the filler relatively fine, the porous mass of filler material containing boron carbide or any other constituent of the composite whose reaction with silicon is thermodynamically, but perhaps not kinetically favored, and whose reaction with silicon is not desired, should not be exposed to excessive temperatures, especially during infiltration. As will be shown in more detail below, a porous mass of boron carbide particulate has been successfully infiltrated with a boron-doped silicon infiltrant at a temperature of about 1550° C. without causing chemical attack on the boron carbide phase.

Further on the subject of producing composite bodies containing large amounts of hard phase(s), these high loadings should not be accomplished through production of large amounts of the in-situ silicon carbide phase, but instead through the engineering of highly loaded masses of the filler material. For example, the porous mass to be infiltrated preferably contains free or elemental carbon as the carbon source to form the in-situ silicon carbide. The amount of this free carbon should be limited to (generally) no more than about 10 percent by volume of the porous mass, and preferably, no more than about 5 or 6 percent. Thus, in general, the amount of silicon carbide produced in-situ should be limited to no more than about 24 volume percent of the final composite body. Among the problems that result from excessive reaction during the infiltration process are temperature spikes due to the exothermic nature of the chemical reaction of silicon and carbon. Such temperature spikes can cause cracking due to localized thermal expansion. Also, the conversion of elemental carbon to silicon carbide entails a volumetric expansion of about 2.35 times. Thus, large amounts of reaction are also detrimental from the standpoint that the large volumetric change can also lead to cracking.

A source of reactable or "free" carbon in the porous mass is not required to achieve infiltration, although such a source assists in the infiltration process. When such a carbon source is utilized, however, it usually takes the form of elemental carbon, such as graphite. For many applications, particularly those requiring high stiffness, it is desirable that the silicon carbide of the resulting composite body be at least partially interconnected. This outcome is more readily achieved if the carbon in the porous mass or preform is interconnected. Further, interconnected carbon in the porous mass or preform assists the infiltration process in terms of speed and reliability. In a preferred embodiment, the carbon is introduced to the porous mass as a resin. This mixture may then be molded to the desired shape. Curing the resin renders the porous mass self-supporting, e.g., as a preform. During subsequent thermal processing, or during an intervening firing step, typically in a non-oxidizing atmosphere, the resin pyrolyzes to carbon in interconnected form to yield a preform containing at least about 1 percent by volume of carbon. The resin infiltration and pyrolysis cycle may be repeated one or more times if an increase in the carbon content is needed.

The following non-limiting examples further illustrate the instant invention.

EXAMPLE 1

This example demonstrates the production via reactive infiltration of a Si/SiC composite body containing a boron carbide reinforcement, i.e., "RBBC". More specifically, this Example demonstrates the infiltration of a silicon-containing melt into a preform containing an interconnected carbon phase derived from a resinous precursor, and silicon carbide and boron carbide particulates.

Preforms were prepared by a sedimentation casting process. Specifically, about 28 parts of water were added to 100 parts of ceramic particulate and 8 parts of KRYSTAR 300 crystalline fructose (A. E. Staley Manufacturing Co.) to make a slurry. The ceramic particulate content consisted of about equal weight fractions of 220 grit TETRABOR® boron carbide (ESK GmbH, Kempten, Germany, distributed by MicroAbrasives Corp., Westfield, Mass.) having a median particle size of about 66 microns and 500 grit CRYSTOLON green silicon carbide (St. Gobain/Norton Industrial Ceramics) having a median particle size of about 13 microns (Grade 500 RG). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant (Sil-Clean, Plastic Tooling Supply Co., Exton, Pa.). The wetted rubber mold was then placed onto the graphite plate and allowed to dry. The slurry was poured into the cavity. Vibration was commenced.

The residual liquid on the top of the casting was blotted up with a sponge periodically during sedimentation. After the particulates had fully settled (about 3 hours), vibration was halted. The graphite plate, the rubber mold and the castings inside were transferred from the vibration table to a freezer maintained at a temperature of about minus 20° C. The casting was thoroughly frozen in about 6 hours, thereby forming a self-supporting preform.

From the freezer, the frozen preform was demolded and placed onto a graphite setter tray. The graphite tray and preform were then immediately placed into a nitrogen atmosphere furnace at ambient temperature. The furnace was energized and programmed to heat to a temperature of about 50° C. at a rate of about 10° C. per hour, to hold at about 50° C. for about 8 hours, then to heat to a temperature of about 90° C. at a rate of about 10° C. per hour, to hold at about 90° C. for about 8 hours, then to heat to a temperature of about 120° C. at a rate of about 10° C. per hour, to hold at about 120° C. for about 4 hours, then to heat to a temperature of about 600° C. at a rate of about 50° C. per hour, to hold at about 600° C. for about 2 hours, then to cool down to about ambient temperature at a rate of about 100° C. per hour. This firing operation pyrolyzed the fructose, yielding a well-bonded preform containing about 2.7 percent by weight carbon.

Figure 1:
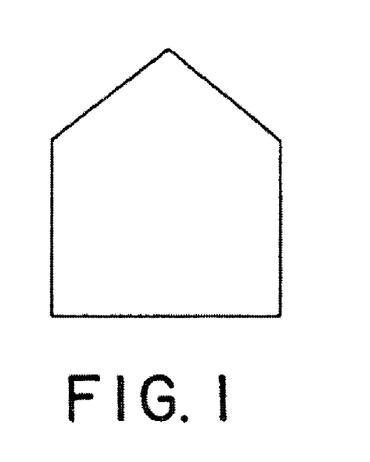
FIG. 1 is a cross-sectional view of a feeder rail as described in Example 1.

The above-mentioned steps were employed to produce two "beam" or feeder rail preforms and a number of tile preforms. Each tile preform had a mass of about 174 grams and had overall dimensions of about 100 mm square by about 9 mm thick. Each rail preform had a cross-section as depicted in FIG. 1 and measured about 220 mm long by about 15 mm wide by about 25 mm thick. During infiltration of the tile preforms, these rails would serve as a conduit for conducting molten infiltrant toward and into the tile preforms.

Next, a set-up to confine the infiltration process was prepared.

Figure 2A:
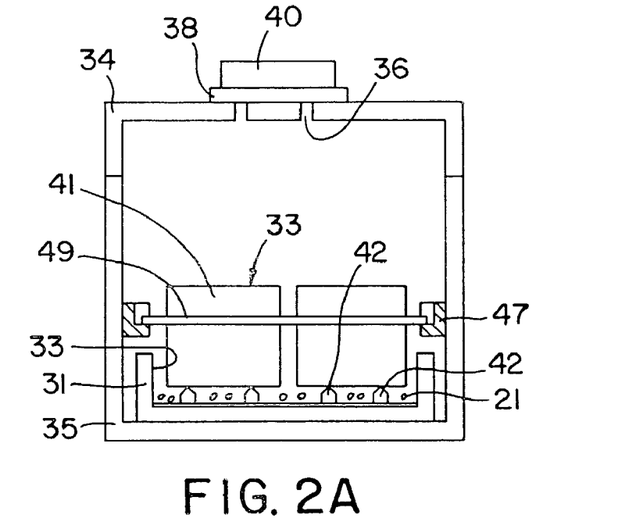
FIGS. 2A and 2B are front and side views, respectively, of a set-up used to prepare the boron carbide reinforced silicon carbide composite tiles of Example 1.
Figure 2B:
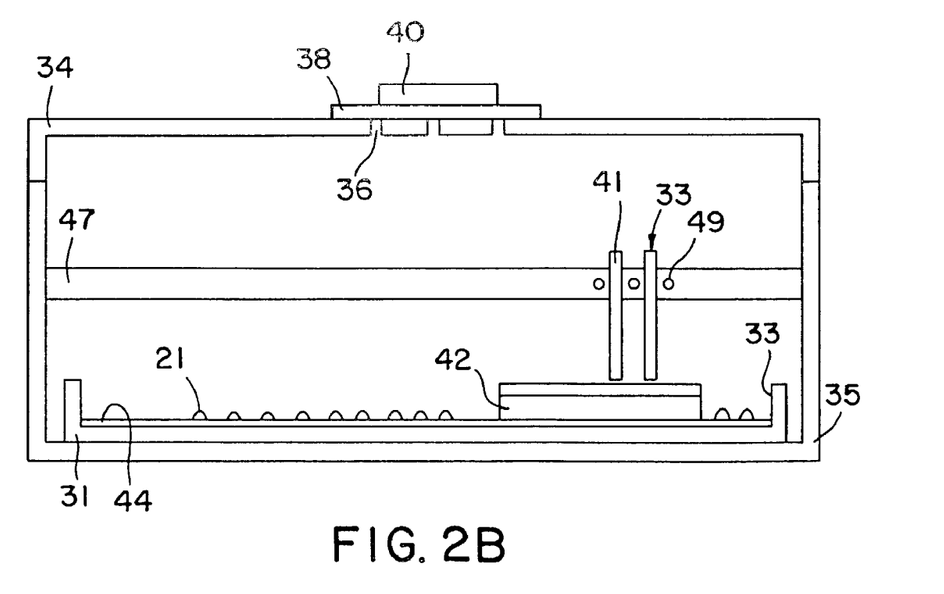

Referring to FIGS. 2A and 2B, the interior surfaces of a Grade ATJ graphite tray 31 (Union Carbide Corp., Carbon Products Div., Cleveland, Ohio) measuring about 790 mm by about 230 mm by about 51 mm deep were spray coated with a boron nitride slurry or paint 33 using a Model 95 Binks spray gun. The boron nitride paint was prepared by diluting about 1800 grams of LUBRICOAT boron nitride paste (ZYP Coatings, Oak Ridge, Tenn.) with deionized water to a volume of about 1 gallon (3.7 liters). Two relatively light coats of this boron nitride paint were applied, with brief ambient temperature drying in air between coats.

The boron nitride-coated tray was then placed into a larger graphite chamber 35 having interior dimensions of about 825 mm long by about 270 mm wide by about 320 mm in height. The chamber also featured means for supporting a parallel row of graphite dowel rods.

Referring now specifically to FIG. 2B, two plies of PANEX® 30 low oxidation carbon cloth 44 (Grade PW03, plain weave, 115 g/m², Zoltek Corp., St. Louis, Mo.) weighing about 48 grams and measuring about 790 mm by about 230 mm was placed on the floor of the coated graphite tray 31, 33. Four boron carbide rail preforms 42, each having a mass of about 190 grams and a length of about 200 mm, were placed on top of the cloth and arranged parallel to the length dimension of the tray. Silicon in lump form 21 (Grade LP, Elkem Metals Co., Pittsburgh, Pa.) and comprising by weight about 0.5 percent Fe (max) and the balance Si, was then distributed more or less uniformly over the carbon cloth between the individual preform rails. Calculations showed that about 1510 grams of silicon infiltrant would be required to completely react the elemental carbon and fill the interstices in the cloth, feeder rail preforms and tile preforms; however, about 10% additional silicon was provided to the set-up.

Graphite dowel rods 49 measuring about 0.25 inch (6 mm) in diameter and spray coated with boron nitride 33 were placed into graphite holders or supports 47. A total of fifteen square tile preforms 41 (only four are shown in the Figure) similarly spray coated with boron nitride 33 were placed across the two rails edgewise in each half of the tray. As the boron nitride tended to act as a barrier material hindering over-infiltration, the surface of the tiles that were to contact the boron carbide preform rails were left uncoated.

The top of the chamber was covered with a loose-fitting (non-hermetically sealing) graphite lid 34 featuring a number of approximately 1 cm diameter through-holes 36 to permit atmosphere exchange. The holes were covered with a piece of graphite felt 38 which was held in place with a graphite block 40 which served as a dead load, thereby completing the set-up.

The completed set-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1 hour, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

Following this heating schedule, the chamber and its contents was recovered from the vacuum furnace, disassembled and inspected. The silicon infiltrant had melted and infiltrated through the carbon cloth, thereby converting the carbon cloth to silicon carbide cloth. The molten silicon infiltrant had also infiltrated through the rail preforms and into the square tile preforms, and reacting with the elemental carbon therein, to form dense, silicon carbide matrix composite bodies having a boron carbide reinforcement. Because each tile preform was supported by the rails in line contact, only low-to-moderate hand force was sufficient to separate the RBBC composite tiles from the feeder rail composite material.

EXAMPLE 2

The technique of Example 1 was substantially repeated, except that no silicon carbide particulate was used in fabricating the preform, and the particle size distribution of the boron carbide was modified such that substantially all particles were smaller than about 45 microns. Following the pyrolysis step, the preforms contained about 75 percent by volume of the boron carbide particulate and about 4 percent by volume of carbon.

Figure 3:
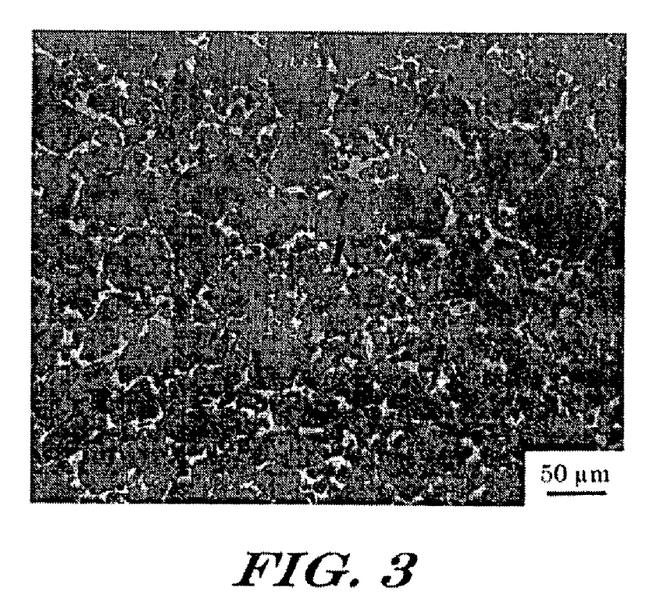
FIG. 3 is an optical photomicrograph of a polished cross-section of the RBBC material produced in accordance with Example 2.

After infiltration, the ceramic material contained nominally 75 vol. % boron carbide, 9 vol. % reaction-formed SiC, and 16 vol. % remaining Si (i.e., an RBBC composite). A polished section was examined using a Nikon Microphot-FX optical microscope. An optical photomicrograph of the material is shown in FIG. 3. It is clearly evident that, by careful selection of processing conditions, including addition of a source of boron to the silicon infiltrant, little growth and interlocking of the particles has occurred, thus allowing a relatively fine microstructure to be maintained. For instance, the photomicrograph shows little visible reaction between the silicon and boron carbide as a result of the infiltration process.

EXAMPLE 3

The technique of Example 2 was substantially repeated, except that, before supplying the silicon infiltrant to the lay-up, a monolayer of TETRABOR® boron carbide particulate (220 grit, ESK) was sprinkled onto the carbon cloth between the feeder rails. The amount of silicon was concomitantly increased to account for the added boron carbide, and to maintain an excess supply of silicon of about 10 percent, as in Example 1.

EXAMPLE 4

The technique of Example 2 was substantially repeated, except that silicon carbide particulate was substituted for the boron carbide particulate. As in Example 2, however, the particle size distribution of the silicon carbide blend was such that substantially all particles were smaller than about 45 microns. Following the pyrolysis step, the preforms contained about 75 percent by volume of the silicon carbide particulate and about 4 percent by volume of carbon.

Figure 4:
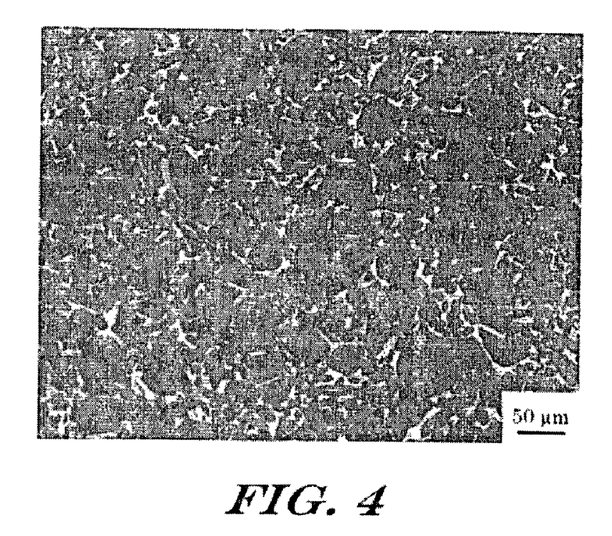
FIG. 4 is an optical photomicrograph of a polished cross-section of the SiC-filled RBSC material produced in accordance with Example 4.

After infiltration with molten Si, the resultant bodies consisted of 84 vol. % SiC (75 original and 9 reaction formed) and 16 vol. % Si (i.e., an RBSC composite). A typical microstructure (optical photomicrograph) of the material is shown in FIG. 4.

In the optical photomicrograph, it is not possible to differentiate between the original SiC and the reaction-formed SiC. As with the reaction bonded boron carbide of Example 2, the reaction bonded SiC ceramic shown in FIG. 4 displays little interlocking and clustering of the SiC, thus allowing a relatively fine microstructure to be maintained.

EXAMPLE 5

The technique of Example 4 was substantially repeated, except that the feeder rail preforms were fabricated using the Example 2 procedure, i.e., made from boron carbide particulate rather than silicon carbide particulate. Thus, the molten infiltrant that reactively infiltrated the silicon carbide tile preforms contained a boron source; that is, consisted of an alloy of silicon and boron.

Characterization of Mechanical and Physical Properties

After the fabrication step, various mechanical and physical properties of the instant reaction-bonded ceramic composite materials were measured. Density was determined by the water immersion technique in accordance with ASTM Standard B 311. Elastic properties were measured by an ultrasonic pulse echo technique following ASTM Standard D 2845. Hardness was measured on the Vickers scale with a 2 kg load per ASTM Standard E 92. Flexural strength in four-point bending was determined following MIL-STD-1942A. Fracture toughness was measured using a four-point-bend-chevron-notch technique and a screw-driven Sintech model CITS-2000 universal testing machine under displacement control at a crosshead speed of 1 mm/min. Specimens measuring 6×4.8×50 mm were tested with the loading direction parallel to the 6 mm dimension and with inner and outer loading spans of 20 and 40 mm, respectively. The chevron notch, cut with a 0.3 mm wide diamond blade, has an included angle of 60° and was located at the midlength of each specimen. The dimensions of the specimen were chosen to minimize analytical differences between two calculation methods according to the analyses of Munz et al. (D. G. Munz, J. L. Shannon, and R. T. Bubsey, "*Fracture Toughness Calculation from Maximum Load in Four Point Bend Tests of Chevron Notch Specimens,*" *Int. J. Fracture*, 16 R137–41 (1980)).

Results of density, Young's modulus, flexural strength and fracture toughness of some of these reaction-bonded ceramics are provided in Table I. When appropriate, the results are provided as a mean +/− one standard deviation.

TABLE I

| Property | Example 4 RBSC | Example 2 RBBC |
| --- | --- | --- |
| Density (kg/m$^3$) | 3060 | 2570 |
| Young's Modulus (GPa) | 384 +/− 2 | 382 +/− 6 |
| Flexural Strength (MPa) | 284 +/− 14 | 278 +/− 14 |
| Fracture Toughness (MPa-m$^{1/2}$) | 3.9 +/− 0.5 | 5.0 +/− 0.4 |

The density of the silicon carbide-based reaction-bonded composite material is about 6% lower than monolithic silicon carbide due to the presence of the silicon phase, which has relatively low density. This reduced density is important for applications, such as armor, that are weight specific. The boron carbide-based reaction-bonded composite material has very low density and is similar to that of monolithic boron carbide.

The Young's moduli of the RBSC and RBBC ceramics are essentially the same, and compare favorably with other high performance ceramic materials. The specific results are as predicted based on the Young's modulus values for dense silicon carbide, boron carbide and silicon: approximately 450, 450 and 120 GPa, respectively. In particular, on a weight specific basis, the RBBC composite has a very high Young's modulus.

The fracture toughness of the RBSC composite material of nominally 4 MPa-m$^{1/2}$, is consistent with most SiC-based ceramics. Surprisingly, the RBBC composite material shows a 28% increase in toughness relative to the reaction bonded SiC material, despite the fact that no ductile phase was added. A possible explanation for this increased toughness was found by examining fracture surfaces, as is explained in the next section.

Analysis of Fracture Surfaces

The relatively high fracture toughness of the RBBC ceramic was unexpected. To gain an understanding for this result, the fracture surfaces of the RBSC and RBBC ceramics were studied and compared. The SEM fractographs for the two materials are provided in FIGS. 5A and 5B, respectively.

Figure 5A:
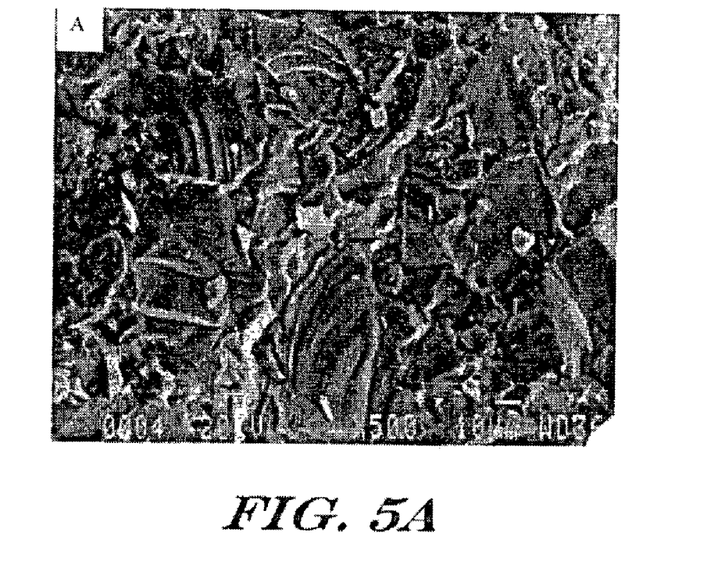
FIGS. 5A and 5B are approximately 350× magnification SEM fractographs of the RBSC and RBBC composite materials of Examples 4 and 2, respectively.
Figure 5B:
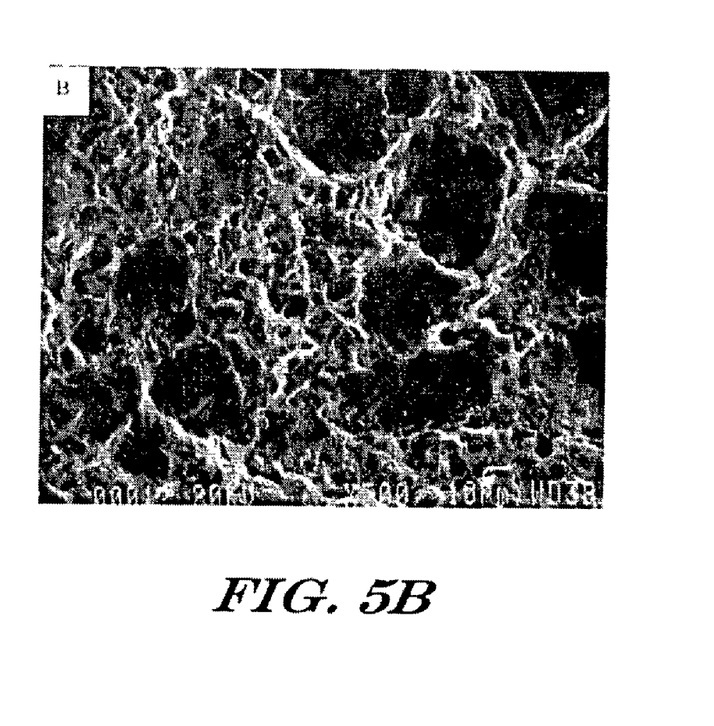

A significant difference between the two fracture surfaces is seen. The RBSC ceramic shows brittle, transgranular fracture of the SiC particles. Also, brittle fracture of the Si matrix is seen. In addition, some indications of interfacial cracking between the Si and SiC are seen. The RBBC ceramic shows brittle, transgranular fracture of the boron carbide particles. However, the silicon component shows some highly unexpected ductile behavior with the characteristic chisel-like rupture pattern. In addition, no evidence of failure at the interfaces between the particles and matrix is seen. It is felt that the observed semi-ductile failure of the silicon phase is contributing to the relatively high toughness of the RBBC ceramic (Table I).

Figure 6:
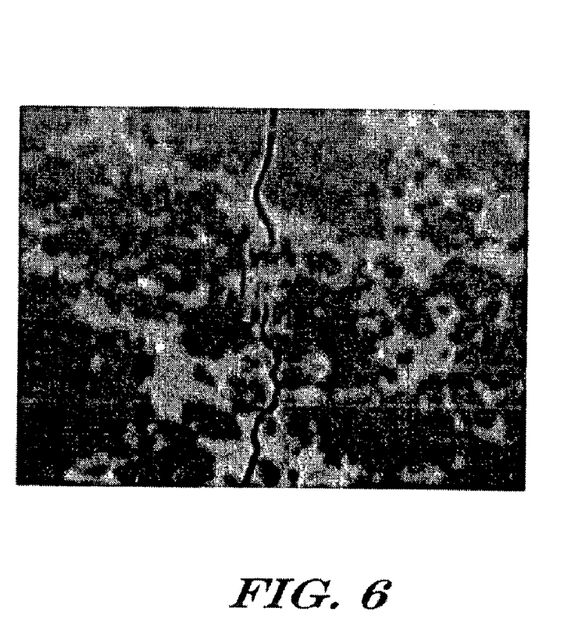
FIG. 6 is an approximately 600× magnification SEM photomicrograph of a crack in a polished section of the RBBC material of Example 2.

FIG. 6 is an SEM photomicrograph of a crack propagating through a polished surface of the RBBC sample of Example 2. In at least two locations, a phase bridges the crack, similarly suggesting the presence of a ductile phase.

Silicon normally undergoes a brittle to ductile transition at around 500° C.; however, the transition temperature decreases as the dislocation density in the silicon increases. In the Warren study (Ibid.), more surface dislocations were introduced to the surface of a sample by grinding, which reduced the brittle-to-ductile transition temperature.

In the RBSC system, once the silicon phase solidifies, little additional stress will be induced in the silicon phase on cooling from the processing temperature because both silicon and silicon carbide have nominally the same CTE. Thus, the dislocation density in the silicon should be low. However, the situation is very different in the RBBC ceramic. Upon cooling from the process temperature, the boron carbide and silicon will shrink at different rates, with boron carbide shrinking faster due to its higher CTE, i.e., about 5.4 ppm/K versus about 4 ppm/K. Thus, the silicon will become highly stressed and thus will have a high dislocation density.

This high dislocation density may reduce the ductile-brittle transition temperature in silicon to below ambient temperature.

EXAMPLE 6

This Example demonstrates that the presence of boron associated with the silicon infiltrant, either as a dissolved species or as a precipitated species, is not responsible for the enhanced toughness observed in the RBBC composite body of Example 2.

Specifically, the RBSC composite body of Comparative Example 2 was measured for fracture toughness, as described above. The fracture toughness was no higher than for RBSC composite material not containing boron, e.g., the Example 4 material; in fact, it was slightly lower.

Thus, something other than boron is responsible for the increase in fracture toughness of RBBC.

Utility of RBBC as Armor for Defeating Ballistic Projectiles

1. Hardness Data

Hardness is a very important parameter for armor materials. Previous work has demonstrated that high mass efficiencies are only obtained versus hard armor piercing projectiles when the projectiles are fractured, and that to effectively fracture the projectile, an armor must have high hardness. (See, for example, M. L. Wilkins, R. L. Landingham, and C. A. Honodel, "Fifth Progress Report of Light Armor Program," Report No. UCRL-50980, University of CA, Livermore, January 1971; also C. Hsieh, "Ceramic-Faced Aluminum Armor Panel Development Studies," Appendix 9 of Report No. JPL-D-2092, Jet Propulsion Laboratory, February 1985.)

However, it is difficult to compare the many hardness data in the open literature because results can be highly dependent on test method and technique. Therefore, for the instant invention many different commercial materials were obtained. Hardness measurements were then made on both the commercial materials and the new reaction bonded ceramics of the instant invention in an identical manner so that true comparisons could be made. The results are provided in Table II.

TABLE II

| Material | Vickers' Hardness with 2 kg Load (kg/mm$^2$) |
| --- | --- |
| 7.62 mm M2 AP Bullet (Tool Steel) | 926 +/− 26 |
| 14.5 mm BS-41 Bullet (WC/Co) | 1644 +/− 30 |
| Sintered AlN | 1044 +/− 63 |
| Pure Si | 1243 +/− 21 |
| 90% Sintered Al$_2$O$_3$ | 1250 +/− 89 |
| Hot Pressed AlN | 1262 +/− 51 |
| 99.5% Sintered Al$_2$O$_3$ | 1499 +/− 74 |
| Hot Pressed Al$_2$O$_3$ | 2057 +/− 82 |
| Hot Pressed TiB$_2$ | 2412 +/− 135 |
| Hot Pressed TiC | 2474 +/− 188 |
| Hot Pressed SiC | 2640 +/− 182 |
| Hot Pressed B$_4$C | 3375 +/− 212 |
| RBSC | 2228 +/− 274 |
| RBBC | 2807 +/− 54 |

The RBSC and RBBC ceramics have very high hardnesses that are well in excess of both tool steel and WC/Co projectiles. In both cases, the RBSC and RBBC composites have hardnesses that more-or-less reflect the weighted average hardness of the constituents. In particular, because of the very high hardness of the boron carbide component, the RBBC composite system has a very high hardness value.

2. Ballistic Testing

Candidate ceramic armor materials were provided in the form of square tiles measuring about 100 mm on a side.

To produce an armor target for testing, the ceramic tile is attached to a SpectraShield® polymer composite backing layer (AlliedSignal Inc., Morristown, N.J.). This material is supplied as a 54 inch (1370 mm) wide roll consisting of 2 plies of unidirectional fibers embedded in a resin matrix, with the fibers of one ply being orthogonal to the fibers of the other ply. A number of 12-inch (305 mm) wide sheets were cut from the roll. The appropriate number of these sheets were then laminated and consolidated in an autoclave at an applied pressure of about 150 psi (1.3 MPa) at a temperature of about 121° C. for about 60 minutes, thereby forming a rigid polymer composite plate. Following consolidation, a backing plate measuring about 12 inches (305 mm) square was cut from the 54 by 12 inches (1370 by 305 mm) plate using a band saw or water jet. An approximately 5 inch (120 mm) square region in the center of the backing plate was lightly abraded using 120 grit sandpaper. After cleaning the surfaces to be bonded with isopropyl alcohol, a candidate armor tile was bonded to the center of the backing plate using two plies of 76 microns thick urethane film adhesive. The bond was cured under full vacuum in an oven maintained at a temperature of about 121° C. for about 30 minutes, thereby forming a ballistic test coupon.

The weight of the backing plate was varied according to the number of laminates used; the weight of the ceramic tile was varied according to the thickness dimension to which the ceramic tile was ground. In each instance, however, the total areal density (ceramic tile plus backing material) was maintained at roughly the same amount.

A target for ballistic testing was assembled as follows: The ballistic test coupon was placed in front of 28 plies of KM2 (600 denier) blanket with rip-stop nylon and camouflage cordura covers to simulate the outer tactical vest (OTV) of a body armor. The OTV simulant and test coupon were located in front of a 100 mm thick block of Roma Plastiline modeling clay that had been conditioned at a temperature of about 35° C. for about 6 hours. The test coupon and OTV simulant were secured to the clay block with duct tape, and the clay block was backed up by a steel support structure that was secured to the test table, thereby completing the target.

The targets were shot at zero degrees obliquity using 7.62 mm caliber projectiles at varying velocities. The basic unit of ballistic penetration resistance used in this testing is the $V_{50}$, the velocity of the projectile at which partial penetration and complete penetration of the target are equally likely.

3. Ballistic Data

The instant RBBC materials of Example 2 were evaluated as candidate armors, and compared to the SiC-filled RBSC material of Example 4, as well as to commercial hot pressed $B_4C$ (the control). In one series of tests, the reaction bonded SiC and commercial hot pressed $B_4C$ were tested ballistically versus ball rounds as the ballistic projectile; and in a second set of tests, the reaction bonded boron carbide and the hot pressed boron carbide were tested versus armor piercing (AP) rounds.

The results of ballistic testing are provided in Tables III and IV. In Table III, test results versus a 7.62 mm M80 ball round for the RBSC of Example 4 and commercial hot pressed $B_4C$ (control) are provided. In Table IV, test results versus a 7.62 mm AP M2 round for the RBBC of Example 2 and commercial hot pressed $B_4C$ are provided. In each case, the tables provide the areal density of the system, the mass efficiency of the target, and the normalized mass efficiency relative to the hot pressed $B_4C$ control. The mass efficiencies in the tables were determined based on available data for rolled homogeneous steel armor (RHA) versus the same threats. Specifically, the mass efficiency was calculated as the areal density of RHA required to give the same performance divided by the areal density of the tested targets.

TABLE III

| | Armor System Areal Density kg/m² (psf) | Mass Efficiency (RHA Equivalent) | Normalized Mass Efficiency |
|---|---|---|---|
| Hot Pressed $B_4C$ (control) | 23.5 (4.82) | 4.56 | 1.00 |
| RBSC (Example 4) | 23.9 (4.89) | 5.11 | 1.12 |

TABLE IV

| | Armor System Areal Density kg/m² (psf) | Mass Efficiency (RHA Equivalent) | Normalized Mass Efficiency |
|---|---|---|---|
| Hot Pressed $B_4C$ (control) | 29.0 (5.95) | 4.53 | 1.00 |
| RBBC (Example 2) | 30.2 (6.18) | 4.85 | 1.07 |

Figure 7A:
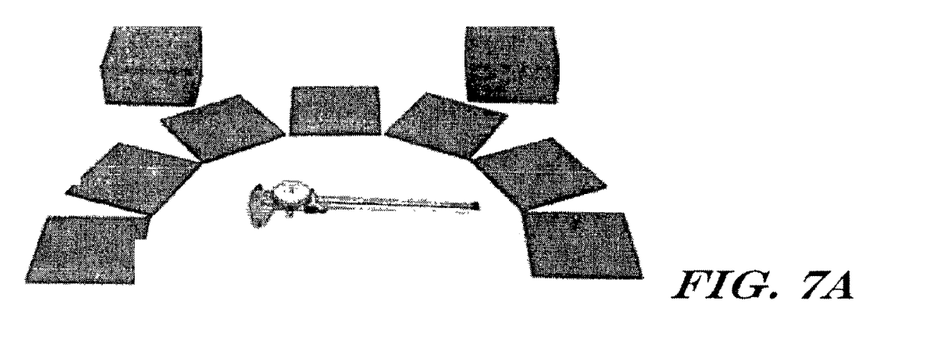
FIGS. 7A–7C illustrate several applications of the armor material embodiment of the instant invention.
Figure 7B:
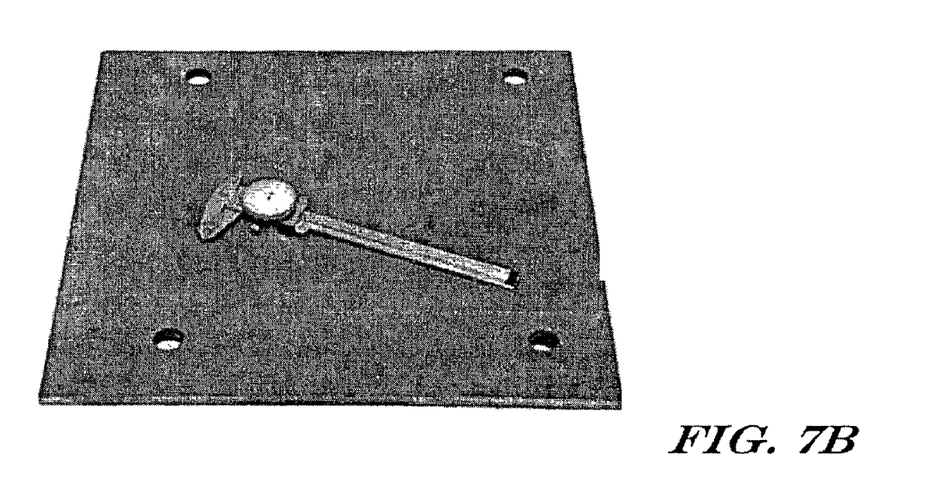
Figure 7C:
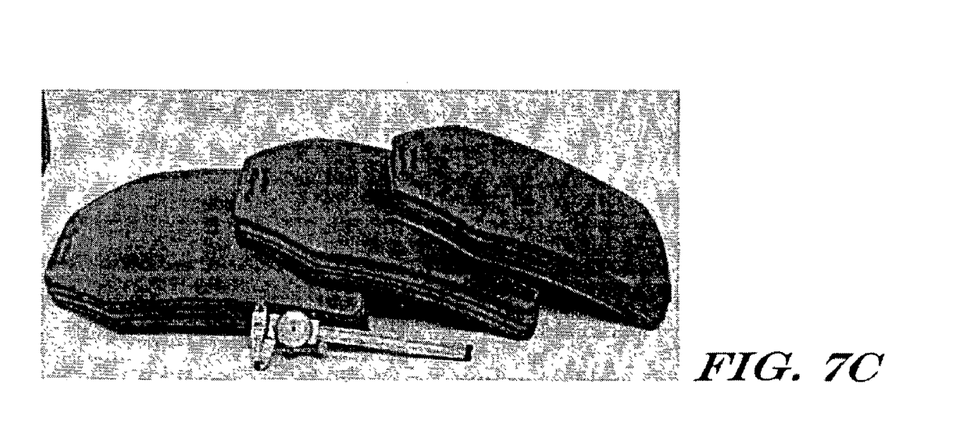

The ballistic results show that the armor designs employing lower cost reaction bonded ceramics had mass efficiencies equivalent to armors of the same design using hot pressed ceramics. This has enabled the production of cost effective armor products for various applications. In FIGS. 7A and 7C, for example, the aircraft armor and personnel armor tiles were fabricated from SiC-filled RBSC. The vehicle armor plate of FIG. 7B was fabricated from RBBC.

INDUSTRIAL APPLICABILITY

The toughness enhanced composite materials of the instant invention possess exceptional hardness and stiffness, low specific gravity and relatively high flexural strength. Although the instant disclosure has focused primarily on the potential application of the instant materials as armor to defeat ballistic projectile threats, they should also find many applications where rigidity and low specific gravity are important materials properties, such as in semiconductor capital equipment components (e.g., wafer chucks, wafer handling arms, process chambers, etc.). Precision equipment industries such as metrology and precision optics will benefit from these composite materials. The instant composite materials might also be attractive as abrasives or wear-resistant parts. Further, these boron carbide composites may find applications in the nuclear industry, specifically, in applications where neutron absorption is important.

An artisan of ordinary skill will readily appreciate that numerous variations and modifications can be made to the invention as disclosed and exemplified above without departing from the scope of the invention as set forth in the appended claims.

What is claimed is:

1. A composite material comprising:
   a matrix comprising silicon carbide;
   at least one phase comprising elemental silicon distributed throughout said matrix, said silicon exhibiting at least some ductility at 20° C.; and
   at least one reinforcement phase consisting essentially of at least one substantially inert filler material comprising at least one substance having a greater coefficient of thermal expansion than said silicon, said at least one reinforcement phase being distributed throughout said matrix, said at least one substance making up at least about 34.5 percent by weight of said composite material and having a morphology selected from the group consisting of particles, flakes, platelets and aggregate.

2. The composite material of claim 1, wherein said reinforcement phase comprises boron carbide.

3. The composite material of claim 1, wherein said reinforcement phase possesses a linear CTE (measured between 21° C. and 100° C.) of at least about 5.4 ppm/K.

4. The composite material of claim 1, wherein said at least one phase comprising elemental silicon is at least partially interconnected.

5. The composite material of claim 1, wherein said at least one phase comprising elemental silicon further comprises boron.

6. The composite material of claim 5, wherein at least some of said boron is dissolved in said silicon.

7. The composite material of claim 1, wherein said silicon is in the form of an alloy.

8. The composite material of claim 1, wherein said silicon comprises a high density of dislocations.

9. The composite material of claim 1, wherein said silicon comprises a high pressure phase.

10. The composite material of claim 1, wherein said silicon comprises a beta-tin crystalline structure.

11. The composite material of claim 1, wherein said silicon exhibits transformation toughening.

12. The composite material of claim 1, wherein said silicon exhibits twinning.

13. The composite material of claim 2, wherein said boron carbide is provided in the form of particulate, and said composite material has utility as a ballistic armor.

14. The composite material of claim 1, wherein at least said matrix and said at least one reinforcement material comprises crystallites, and further wherein no more than about 10 percent of the total volume of said crystallites are larger than about 100 microns in diameter.

15. The composite material of claim 1, wherein said composite material comprises no more than about 30 percent by volume of said at least one phase comprising elemental silicon.

16. The composite material of claim 1, wherein said substance comprises at least one material selected from the group consisting of aluminum nitride and titanium diboride.

17. The composite material of claim 1, wherein said at least one substance is present in an amount up to about 75 percent by volume of said composite material.

* * * * *